(12) United States Patent
Carew

(10) Patent No.: US 8,632,678 B2
(45) Date of Patent: Jan. 21, 2014

(54) FILTER APPARATUS AND METHOD OF REMOVING ORGANIC WASTE

(71) Applicant: E. Bayne Carew, Milford, MI (US)

(72) Inventor: E. Bayne Carew, Milford, MI (US)

( * ) Notice: Subject to any disclaimer, the term of this patent is extended or adjusted under 35 U.S.C. 154(b) by 0 days.

(21) Appl. No.: 13/677,966

(22) Filed: Nov. 15, 2012

(65) Prior Publication Data

US 2013/0075320 A1 Mar. 28, 2013

Related U.S. Application Data

(60) Division of application No. 12/208,869, filed on Sep. 11, 2008, now Pat. No. 8,329,037, which is a continuation-in-part of application No. 12/186,421, filed on Aug. 5, 2008, now Pat. No. 7,674,377, which is a continuation-in-part of application No. 11/942,525, filed on Nov. 19, 2007, now Pat. No. 7,513,372, which is a continuation-in-part of application No. 11/531,986, filed on Sep. 14, 2006, now abandoned, which is a division of application No. 10/863,798, filed on Jun. 8, 2004, now Pat. No. 7,122,123, which is a division of application No. 09/931,510, filed on Aug. 16, 2001, now Pat. No. 6,761,270.

(60) Provisional application No. 60/225,895, filed on Aug. 17, 2000.

(51) Int. Cl.
*B01D 29/90* (2006.01)

(52) U.S. Cl.
USPC ... 210/192; 210/416.1; 210/359; 210/497.01; 210/243; 210/209; 210/295; 210/748.01; 422/22; 422/24; 422/186; 422/186.06; 422/186.3; 204/155; 204/156; 204/157.15; 204/157.22; 204/164

(58) Field of Classification Search
USPC ........ 210/748.01, 748.1, 747.1, 747.2, 747.3, 210/758, 767, 785, 209, 211, 405, 413, 414, 210/415, 773, 781, 787, 416.1, 359; 422/22, 24, 186, 186.06, 186.1, 422/186.18, 186.3; 204/155, 156, 157.15, 204/157.22, 164, 193, 194; 250/493.1, 250/504 R, 503.1, 496.1, 494.1
See application file for complete search history.

(56) References Cited

U.S. PATENT DOCUMENTS

| | | | |
|---|---|---|---|
| 1,940,585 A | * | 12/1933 | Fauth ........................... 422/271 |
| 5,069,782 A | * | 12/1991 | Moyher et al. ................ 210/192 |
| 2004/0213710 A1 | * | 10/2004 | Wong ......................... 422/186.3 |

* cited by examiner

*Primary Examiner* — Joseph Drodge
*Assistant Examiner* — Cameron J Allen
(74) *Attorney, Agent, or Firm* — Warner Norcross & Judd LLP

(57) ABSTRACT

A filtration apparatus including an annular filter surrounding a waste treatment chamber, a first turbine drawing liquid up within the chamber and a second turbine driving liquid outwardly through the filter. In the method of treating organic waste, the chamber includes an ultraviolet lamp and a cylindrical baffle surrounding the chamber having a mirrored surface. The disclosed apparatus further includes anodic and cathodic plates surrounding the filter.

17 Claims, 9 Drawing Sheets

FILTER APPARATUS AND METHOD OF REMOVING ORGANIC WASTE

RELATED APPLICATIONS

This application is a divisional application of U.S. Ser. No. 12/208,869, filed Sep. 11, 2008 and claims priority to U.S. Provisional Application No. 60/986,667, filed Nov. 9, 2007, which U.S. Ser. No. 12/208,869, is a continuation-in-part application of U.S. Ser. No. 12/186,421, filed Aug. 5, 2008, now U.S. Pat. No. 7,674,377, issued on Mar. 9, 2010, which was a continuation-in-part application of U.S. Ser. No. 11/942,525, filed Nov. 19, 2007, now U.S. Pat. No. 7,513,372, issued on Apr. 7, 2009, which was a continuation-in-part application of U.S. Ser. No. 11/531,986, filed Sep. 14, 2006, which was a divisional application of U.S. Ser. No. 10/863,798, filed Jun. 5, 2004 now U.S. Pat. No. 7,122,123, issued Oct. 17, 2006, which was a divisional application of U.S. Ser. No. 09/931,510, filed Aug. 16, 2001, now U.S. Pat. No. 6,761,270, issued Jul. 13, 2004, which claims priority to U.S. Provisional Patent Application No. 60/225,895, filed Aug. 17, 2000.

FIELD OF THE INVENTION

This invention relates to a method of removing organic waste from a liquid stream and a filtration apparatus specifically, but not exclusively, adapted to perform this process. The filtration apparatus of this invention may be used to separate and remove organic waste from a liquid stream using a filtration apparatus.

BACKGROUND OF THE INVENTION

Residential, industrial and agricultural wastes include increasingly scarce fresh water which may be recovered and recycled by the filtration apparatus and method of this invention. Fresh water, whether under or above-ground is an increasingly scarce resource for agricultural and residential use. Discharge requirements for human activity are increasingly stringent. The appearance of antibiotics and antibiotic resistant bacteria in runoffs from all sources are subject to new regulations. Thus, there is a long standing need to remove or destroy both pathogens and harmful solutes from liquids including the water supply at reasonable cost.

SUMMARY OF THE INVENTION

The method and apparatus of this invention is specifically, but not exclusively, adapted to separate and extract dissolved organic substances from water and waste liquids, further purifying the liquids to a substantially virgin state and concentrating the accumulated solids which may be recycled or converted to potable water and organic solids. The filtration apparatus and method of this invention may be utilized to treat the liquid filtrate from the filter apparatus disclosed in my co-pending application Ser. No. 12/186,421, filed Aug. 5, 2008. The filtration apparatus of this invention includes a central annular filter element having circumferentially spaced filter pores. A liquid waste treatment chamber is located within the annular filter element in a lower portion thereof and the filtration apparatus includes a first rotating turbine located within the annular filter element drawing liquid upwardly from the liquid waste treatment chamber and a second rotating turbine located within the annular filter element above the first rotating turbine receiving liquid from the first rotating turbine and rotating at a greater velocity than the first rotating turbine. The second rotating turbine drives liquid radially outwardly through the annular filter element into an annular filtrate chamber surrounding the annular filter element and the apparatus includes a liquid outlet receiving liquid filtrate from the annular filtrate chamber. In the disclosed embodiment, the waste treatment chamber of the filtration apparatus includes an axially extending cylindrical ultraviolet lamp and a reflective cylinder surrounding the waste treatment area. The first rotating turbine of this embodiment then draws liquid upwardly around the axial ultraviolet lamp upwardly to the second turbine. The disclosed embodiment of the filtration apparatus further includes a cathodic plate and an opposed anodic plate surrounding the filtrate chamber collecting smaller molecular weight charged organic material having a size less than the size of the filter pores.

In the disclosed embodiment of the filtration apparatus of this invention, the central annular filter element is a continuous flexible resilient helical coil having a regular sinusoidal shape in the direction of the helix defining circumferentially spaced loop-shaped filter pores between adjacent helical coils and the annular filter element includes a filter drive engaging the helical coil to adjust a volume of the loop-shaped filter pores. The helical coil in the disclosed embodiment of this invention is formed from flat wire stock forming flat engaging upper and lower surfaces on adjacent helical coils. In this embodiment, the flat engaging upper and lower surfaces of the helical coil includes circumferentially spaced radial grooves having a width of between about one and one hundred nanometers or preferably between about one and fifty nanometers, forming a microfilter when the coils are closed in full registry filtering out cross-linked and aggregates of the organic waste located within or formed in the liquid waste treatment chamber of the annular filter element. The disclosed embodiment of the filter element further includes a pneumatic or hydraulic piston which is driven against the helical coil to open or close the filter pores and which, in the disclosed embodiment, is particularly useful for backwashing of the filter element. During backwashing, the filter element is quickly "opened" by pneumatic pressure, lifting the pneumatic piston and washed by driving backwash liquid through the filter element from the annular filtrate chamber through the filter element.

Further, in the disclosed embodiment of the filtration apparatus of this invention, the first and second rotating turbines include rotating canted fins rotatably supported about a longitudinal axis coincident with a longitudinal axis of the central annular filter element. In the disclosed embodiment, the first rotating turbine includes a plurality of spiral fins each extending spirally around a driven shaft. The second rotating turbine in the disclosed embodiment includes a plurality of fins each defining an acute angle relative to the longitudinal axis and the canted fins of the second rotating turbine is driven at a faster rotational speed or velocity than the spiral fins of the first rotating turbine to drive liquid from the liquid waste received from the waste treatment chamber radially outwardly through the annular microfilter element.

The method of removing organic waste from a liquid waste stream of this invention thus includes treating the liquid waste stream to cross-link or form aggregates of the organic waste while drawing the liquid waste stream upwardly in an axial waste treatment chamber of a filtration apparatus, then driving the treated liquid waste stream radially outwardly through an annular microfilter into an annular chamber surrounding the annular microfilter, collecting organic waste on the microfilter having a particle size greater than a pore size of the microfilter. Then, the method includes removing the liquid filtrate from the annular filtrate chamber and removing the collected organic waste from the inside surfaces of the annular microfilter by periodically backwashing the annular microfilter. In the disclosed embodiment, as described above, the method of this invention further includes treating the liquid waste stream by drawing the liquid waste stream upwardly around an ultraviolet lamp in the waste treatment chamber and collecting smaller charged molecular weight organic materials on charged plates surrounding the annular filtrate chamber. Further, in the disclosed embodiment of the method of this invention, the method includes removing organic waste from an inside surface of the microfilter by substantially increasing the size of the microfilter pores of the microfilter, then directing backwash liquid through the microfilter from the annular filtrate chamber into the waste treatment chamber removing organic waste having a size greater than the pores of the annular filter element during filtering.

As will be understood by those skilled in this art, various modifications may be made to the filter apparatus and method of this invention within the purview of the appended claims. The following description of the preferred embodiments and the embodiments of the filter apparatus disclosed in the appended drawings are for illustrative purposes only and do not limit the scope of this invention except as set forth in the appended claims. Further advantages and meritorious features of the filter apparatus of this invention will be more fully understood from the following description of the preferred drawings and the appended claims, a brief description of which follows.

DESCRIPTION OF THE PREFERRED EMBODIMENTS

As set forth above, the embodiments of the filter apparatus and method of this invention disclosed in the following description of the preferred embodiments are for illustrative purposes only and various modifications may be made to such embodiments within the purview of the appended claims. Referring to the figures, wherein like numerals indicate like or corresponding parts throughout the several views, one embodiment of a filter apparatus for filtering a fluid is generally disclosed at 10. It is understood that the filter apparatus 10 and method of this invention are capable of filtering both liquids and gases as the fluid. However, the filter apparatus 10 of the subject invention is more preferably used to filter fluids having solid particles including, without limitation, slurries of biological or organic waste, including oils. As such, the filter apparatus 10 may be used in combination with other devices, including ion exchange or chelation affinity apparatus or a filter press as discussed further below.

Figure 1:
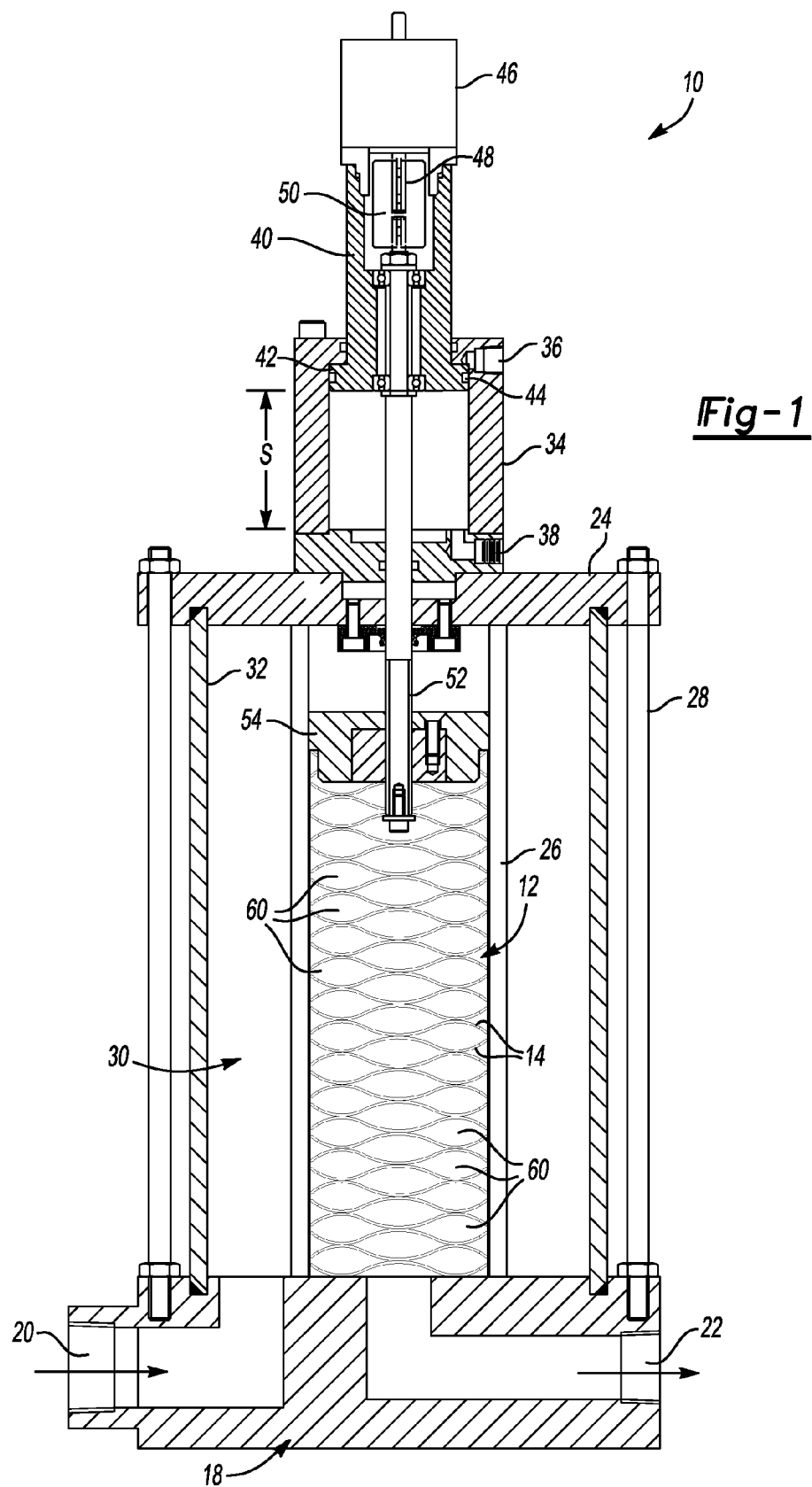
FIG. 1 is a partially cross-sectioned side view of one embodiment of a filter assembly of this invention with the filter element fully expanded.
Figure 2:
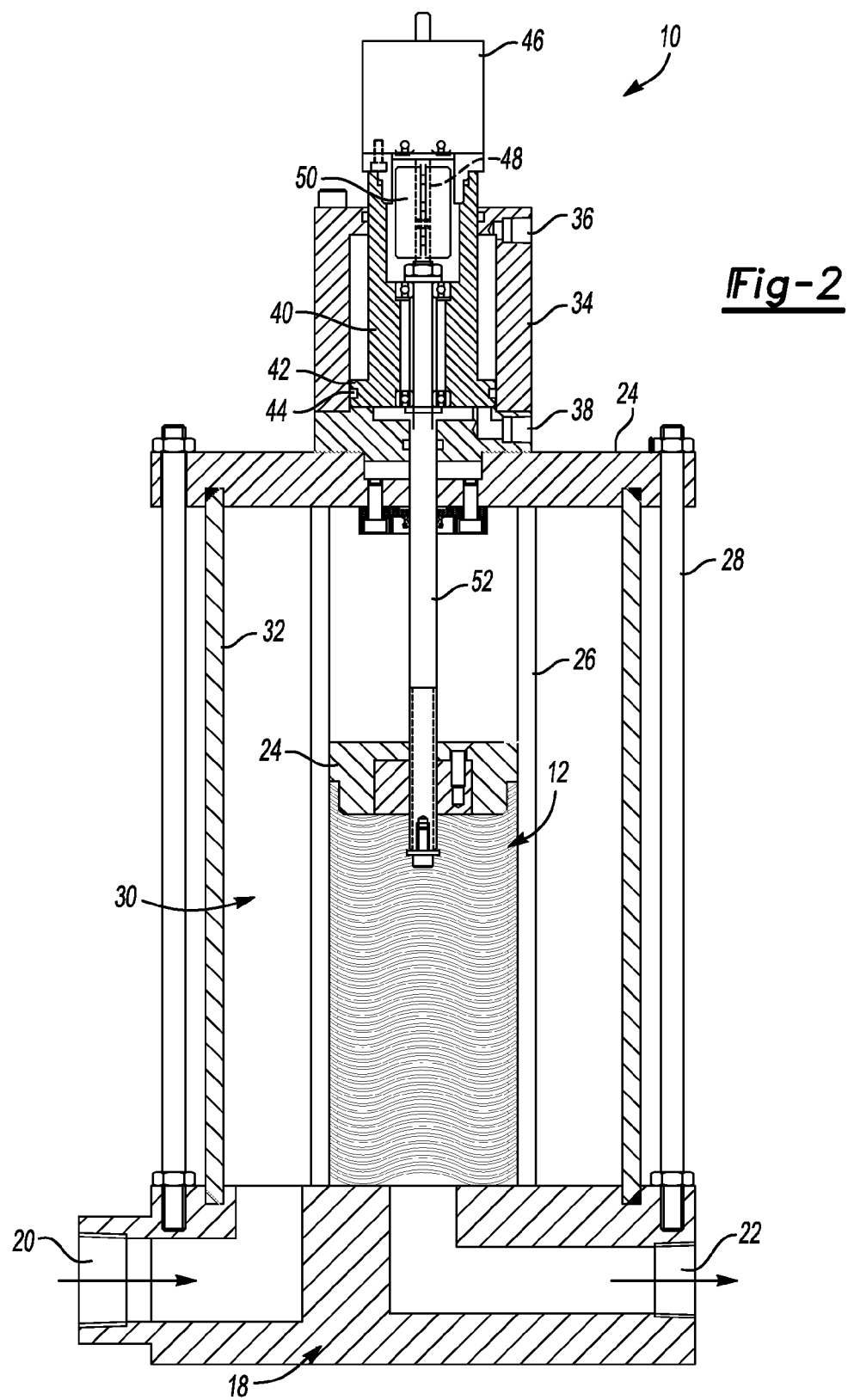
FIG. 2 is a partially cross-sectioned side view of the filter assembly shown in FIG. 1 with the coils of the filter in registry and substantially compressed.
Figure 3:
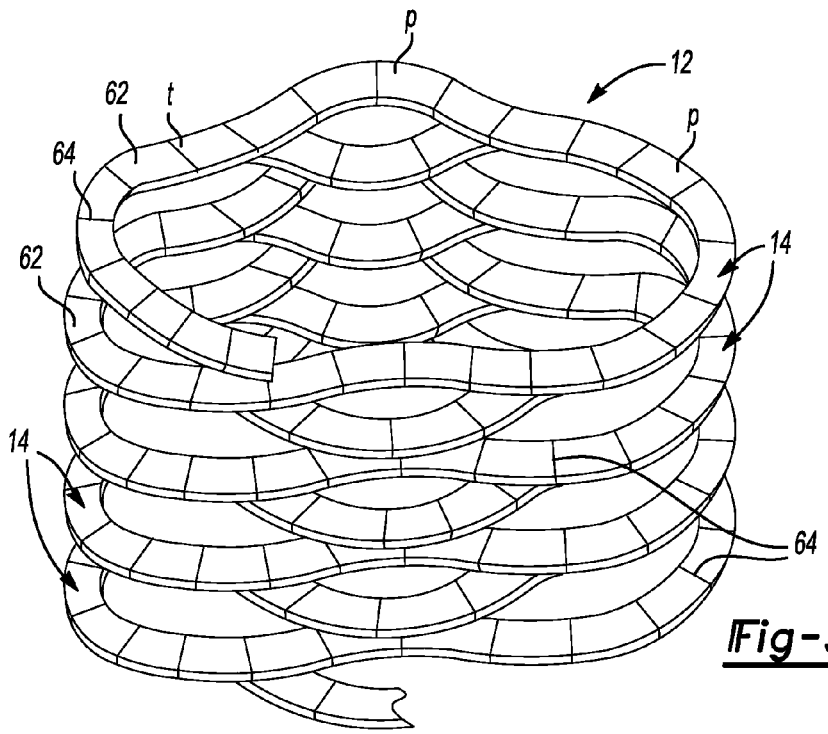
FIG. 3 is a partial top perspective view of the filter element shown in FIG. 1.
Figure 4:
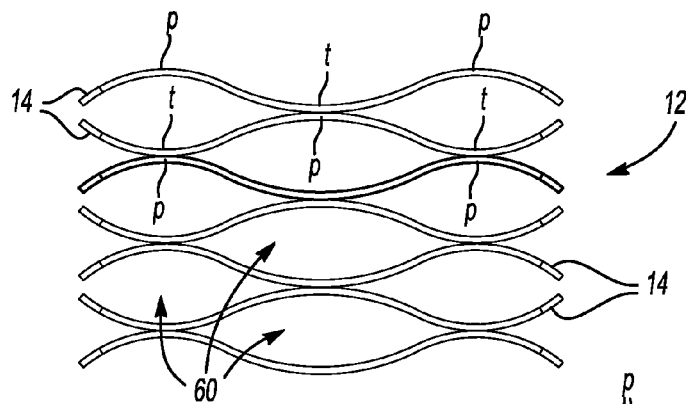
FIG. 4 is a partial side view of the expanded filter element shown in FIG. 1.

FIGS. 1 to 6 illustrate one embodiment of the filter assembly 10 of this invention which may be utilized to perform the methods of filtration described herein. The filter assembly 10 shown in FIGS. 1 and 2 includes an annular filter element 12 including a continuous generally cylindrical helical coil having a plurality of circular interconnected helical coils 14 as best shown in FIG. 3, wherein each generally circular helical coil has a plurality of regular sinusoidal wave forms or shapes including circumferentially spaced peaks and troughs as shown in FIG. 3. The peaks "p" and troughs "t" of adjacent coils 4 are in contact to provide enlarged "loop-shaped" or eyelet-shaped filter pores between adjacent coils as shown in FIG. 4, or the peaks "p" and troughs "t" of adjacent coils 14 may be aligned as shown for example in FIG. 6 as described below.

The filter assembly 10 shown in FIGS. 1 and 2 includes a lower housing 18 having an inlet 20 and an outlet 22 for receiving a fluid stream to be filtered, such as a waste gas or liquid stream as described above. The filter assembly 10 further includes a cover 24 which is supported on the lower housing member 18 by circumferentially spaced inner and outer retention posts 26 and 28, respectively. A filtration chamber 30 is defined between the lower housing member 18 and the cover 24 by a cylindrical housing wall 32. Thus a fluid stream received through inlet 20 is received under pressure in the filtration chamber 30 for filtration by the filter element 12. The fluid stream including contaminants is then received through the filter pores or the radial grooves as described below through the filter element 12 into the axial center of the filter element 12 and the filtrated fluid is then discharged through the outlet 22. As described above, the particles, molecules or material removed by the filter element are removed by backwashing as further described below.

This embodiment of the filter assembly 10 shown in FIGS. 1 and 2 further includes a pneumatic cylinder 34 attached to and supported on the cover 24 of the housing having an air inlet 36 and an air outlet 38. A piston assembly 40 is reciprocally supported in the pneumatic cylinder or chamber 34 including a piston head 42 having an O-ring 44, such that the piston assembly 40 is sealingly supported within the pneumatic cylinder 34. The piston assembly 40 has a stroke "S" as shown in FIG. 1. Pneumatic pressure supplied through air inlet 36 of the pneumatic cylinder 34 will thus drive the piston assembly 40 downwardly from the position shown in FIG. 1 to the position shown in FIG. 2 as described in more detail hereinbelow.

In this disclosed embodiment, the filter assembly 10 further includes a drive assembly engaging the helical coil filter element 12 moving adjacent coils 14, thereby modifying and controlling a volume of the loop-shaped filter pores between adjacent coils as now described. In this disclosed embodiment, the filter assembly 10 includes a stepper motor 46 attached to and supported by the upper end of the piston assembly 40 as shown in FIGS. 1 and 2. As will be understood by those skilled in this art, a stepper motor is a brushless, synchronous electric motor that can divide a full rotation into a large number of steps. When commutated electronically, the motor's position can be controlled precisely, without any feedback mechanism. Although a stepper motor has several advantages for this application, any other type of rotary drive may also be utilized. The driveshaft 48 of the stepper motor 46 is connected in the disclosed embodiment to an upper end of the cylindrical helical filter element 12 to relatively rotate the filter coils to accurately control the volume of the loop-shaped filter pores 60 as described below. The driveshaft 48 of the stepper motor 46 in the disclosed embodiment is connected to a coupling 50 as shown in FIGS. 1 and 2. A shaft 52 connected to the coupling 50 is connected to a clamp assembly connected to the upper end of the filter element 12. The lower end of the filter element 12 is rigidly connected to the lower housing member 18 such that, upon rotation of the clamp assembly 54 by the stepper motor 46, the coils 14 of the filter element 12 are rotated relative to each other as described below.

In the disclosed embodiment, the circular interconnected coils 14 of the filter element 12 are initially aligned crest or peak "p" to trough "t" as shown in FIG. 4 with the filter pores or openings 60 enlarged to their maximum. Alternatively, it would also be possible to initially align the coils peak to peak and trough to trough. It is important to understand, however, that the width or amplitude of the sinusoidal wave or curve has been greatly exaggerated in FIGS. 1, 3 and 4 for a better understanding of the filter assembly of this invention and the method of filtration. As set forth above, the volume of the openings or loop-shaped filter pores 60 of the filter element 12 in the filter apparatus of this invention may be accurately controlled to filter different fluids. First, the piston assembly 40 may simply be extended to compress the filter element, thereby reducing the size or volume of the filter pores 60 by supplying air under pressure through the inlet 36 of the pneumatic cylinder 34. However, in one preferred embodiment, the drive 46 rotates at least one of the coils 14 relative to the remainder of the coils, thereby relatively sliding the opposed flat top and bottom surfaces of adjacent coils relative to each other into and out of registry, thereby accurately controlling the volume of the loop-shaped pores 60. Further, because the filter element 12 is formed of a stiff resilient metal, such as stainless steel, the loop-shaped filter pores 60 are all modified simultaneously, such that all filter pores have essentially the same volume, which is important for accurate control.

Figure 5:
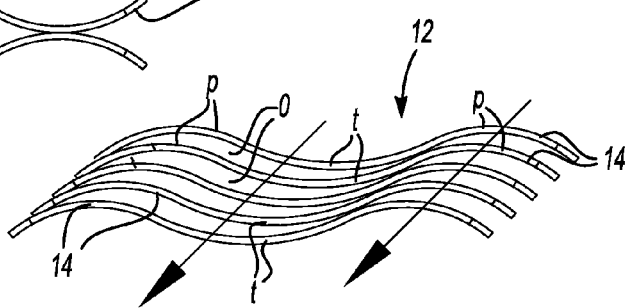
FIG. 5 is a partial side view of the filter element shown in FIG. 4 with the filter coils partially in registry, reducing the size of the filter pores.
Figure 6:
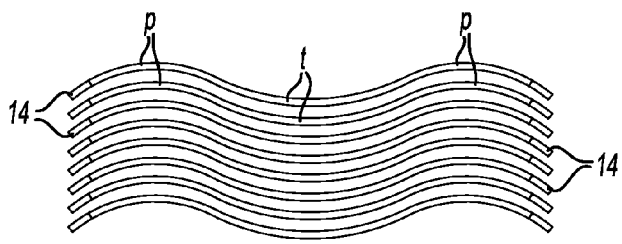
FIG. 6 is a partial side view of the filter elements shown in FIGS. 4 and 5 with the filter coils in full registry as shown in FIG. 2.

As best shown in FIG. 5, rotation of the upper coil of the continuous cylindrical helical coil filter element 12, by rotation of the driveshaft 48 of the stepper motor 46 causes the peaks "p" of adjacent coils to rotatably slide on the flat upper and lower surfaces 62 relative to the remaining coils, reducing or expanding the apertures or filter pores 60. Finally, as shown in FIG. 6, the sinusoidal-shaped coils may be moved or rotated into full registry, such that the peaks "p" and troughs "t" are fully aligned. Again, however, the spacing between adjacent coils 14 has been exaggerated in FIG. 6 for clarity. In fact, the adjacent coils may be in full contact, such that the filter pores 60 between adjacent filter coils is reduced to essentially zero. However, in the disclosed embodiment, at least one of the opposed flat surfaces 62 of the filter coils 14 includes circumferentially spaced radial grooves 64 permitting the flow of fluids through the filter element when the filter pores 60 between adjacent coils are reduced to substantially zero. Thus the radial grooves 64 significantly increase the applications for the filter assembly 10 of this invention.

Having described the embodiment of the filter assembly 10 of this invention as shown in FIGS. 1 to 6, the operation of the filter assembly 10 may now be described. In one embodiment of the filter apparatus 10 of this invention, the filter element 12 is a continuous substantially cylindrical resilient helical coil having a regular sinusoidal shape including regular peaks "p" and troughs "t" as described above. The filter element may be formed of stainless steel, such as 316 stainless steel, which is stiff and resilient. However, the helical coil filter element may also be formed of a Hastaloy or other steel or even plastic. Another advantage of stainless steel is corrosion resistance. The coil preferably is formed from flat metal stock having flat top and bottom surfaces 62, such that the flat surfaces of adjacent coils will slide against each other during rotation as best shown in FIGS. 4 to 6. A suitable thickness between the flat top and bottom surfaces 62 is 0.4 to 2 mm having a width of between 3 and 6 mm. The preferred number of sinusoidal waves of each coil will depend upon the application. However, it has been found that between 3 and 10 sinusoidal curves or waves for each coil 14 will be very suitable for most applications. Further, the "width" of the loop-shaped openings or filter pores will also depend upon the application, but it has been found that filter pores having a maximum width of about 0.5 mm is suitable for most applications. Finally, the depth of the radial grooves 64, which may be formed by laser etching, is preferably between about 0.1 to 10 microns. However, in the embodiment of the organic filtration apparatus 210 described below, the radial grooves may have a diameter in the nanometer range.

The filter assembly 10 is thus operated by adjusting the apertures or loop-shaped filter pores 60 to the desired volume for filtration depending upon the fluid to be filtered by either extending the shaft 52 using pneumatic pressure through inlet port 36, driving the piston assembly 40 downwardly in FIG. 1 to compress the coils against each other, thereby reducing the volume of the filter pores 60 or by retracting the shaft 52 using pneumatic port 38 to increase the volume of the filter pores. However, in one preferred embodiment, the stepper motor 46 may be simultaneously rotated to bring the peaks "p" and troughs "t" into and out of registry as shown, for example, in FIG. 5. As described above, rotation of the upper coil will simultaneously rotate all coils relative to the bottom coil because the filter element is formed of a stiff resilient material, such as 316 stainless steel. The coils may be rotated into full registry, as shown in FIG. 6, wherein the filter pores are reduced to substantially zero and wherein the fluid flow is only through the radial grooves 64. The fluid to be filtered is then received through the housing inlet 20 into the filter chamber 30 and flows through the filter element 12 as shown in FIG. 2. As will be understood, the filter apparatus may be used to filter almost any fluid depending upon the filter pore size including, for example, residential, industrial and agricultural waste and sludges to produce, for example, potable water from waste and may be used for the clarification and refinement of waste oil from waste water-oil mixtures, etc. Upon completion of the filtering process or when the filter element 12 becomes clogged with the particles or media suspended in the fluid, the filter element 12 may be easily flushed by opening the filter pores 60 as shown in FIG. 1 and flushing solution is then received through the outlet 22 and flushed through the filter element 12. In the disclosed embodiment, backwashing may be facilitated by rotating the stepper motor in the opposite direction from the direction used to compress the coils 14 of the filter coil while maintaining the clamp assembly 54 in the extended position as shown in FIG. 2. Then, upon completion of the filtering process, the filter element is "opened" by simply retracting the clamp 54 to the open position shown in FIG. 1 which can be accomplished in a second or two.

The second embodiment of the filter apparatus 110 of this invention illustrated in FIGS. 7 to 12 may be characterized as a centrifugal filter apparatus or more specifically a dual-chambered centrifugal and compressive filtration apparatus for separating waste solids or fluids including, for example, waste solids in oils, water and gas. The elements of the centrifugal filter apparatus 110 are numbered where appropriate in the same sequence as the filter apparatus 10 described above, but in the 100 series to reduce the requirement for a detailed description of like components. The disclosed embodiment of the filter apparatus 110 includes a central annular filter element 112 which, in the disclosed embodiment, is a continuous flexible resilient generally cylindrical helical coil including a plurality of interconnected generally circular helical coils 114 as described above with reference to the filter element 12. However, the centrifugal filter apparatus of this invention may alternatively include any conventional annular generally cylindrical filter element although the helical filter element 112 is preferred in many applications.

The filter apparatus 110 includes a lower housing member 118 and a base member 119, an inlet 120, a supernatant outlet 121 and a solids outlet 122 through base member 119. The disclosed embodiment of the filter apparatus 110 further includes upper housing members 123, 124 and 125, which are retained to the lower housing member 118 by circumferentially spaced retention posts. The disclosed embodiment includes a first annular filtration chamber 130 surrounding the annular filter element 112 and a second filtration chamber 131 within the annular filter element 112 as further described below. The first filtration chamber 130 is defined by the cylindrical housing wall 132 defining a cylindrical inner surface 133. In the centrifugal filter apparatus 110 of this invention, the internal wall 133 of the cannister housing is preferably cylindrical to accommodate the centrifugal fins described below.

The disclosed embodiment of the filter apparatus 110 includes a first pneumatic port 136 adapted to compress the helical filter element 112 and a second pneumatic port 138 adapted to expand the helical filter element as described below. The apparatus further includes a pneumatic cylinder 134 receiving a piston 140 actuated by pneumatic pressure through the pneumatic ports 136 and 138 as described below. The disclosed embodiment of the filter apparatus 110 further includes a motor 142, such as a stepper motor described above, for rotating one or more of the helical coils 114 relative to a remainder of the helical coils into and out of registry to finely adjust the eyelet-shaped filter pores 160 between adjacent helical coils 114 as also described above. In this embodiment, the motor 142 includes a drive shaft assembly 144 connected to a drive gear 146. The drive gear 146 rotatably engages a driven gear 148 which is connected to a tubular driven shaft 150 connected to the upper helical coil 114 as described above with regard to the filter apparatus 10.

In one preferred embodiment, the helical filter element 112 includes both a first filter drive compressing or expanding the helical filter element and a second drive rotating one or more of the helical coils 114 into and out of registry for very accurately controlling the volume of the filter pores 116 between adjacent helical coils 114. In the disclosed embodiment, the first drive is a pneumatic drive, wherein pneumatic pressure received through inlet pneumatic port 136 drives the piston 140 downwardly in FIG. 7 to compress the helical filter element 112. Alternatively, the first drive may be hydraulic. An advantage of a pneumatic filter drive is that the compression on the helical filter element 112 may be released quickly during purging. Detailed or accurate control of the volume of the filter pores 116 in this embodiment is controlled by the second drive which, in the disclosed embodiment, is a stepper motor 142. The stepper motor 142 rotates the drive shaft 144, which rotates the drive gear 146. The drive gear 146 rotates the driven gear 148 and the tubular drive shaft 150 connected to the upper end of the helical filter element 112 to rotate at least one of the helical coils 114 relative to a remainder of the helical coils, thereby rotating the helical coils into and out of registry as described above. FIG. 8 illustrates the filter apparatus 110 after closing the filter pores 160 using the pneumatic adjustment mechanism and rotating the helical filter coils 114 into registry as described above with reference to FIG. 2.

Figure 7:
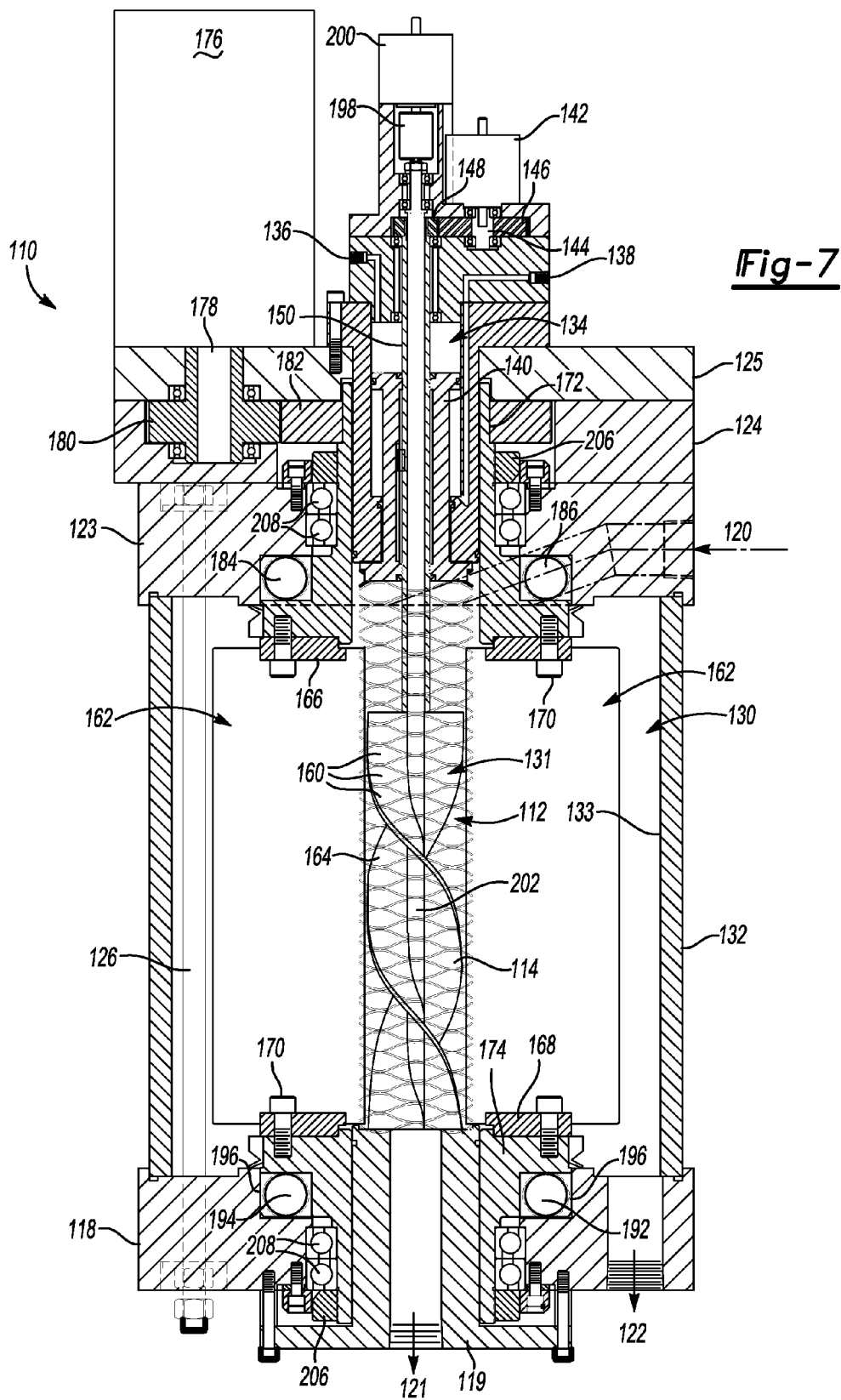
FIG. 7 is a partial side cross-sectional view of a centrifugal filter apparatus of this invention with the helical filter element fully expanded.
Figure 8:
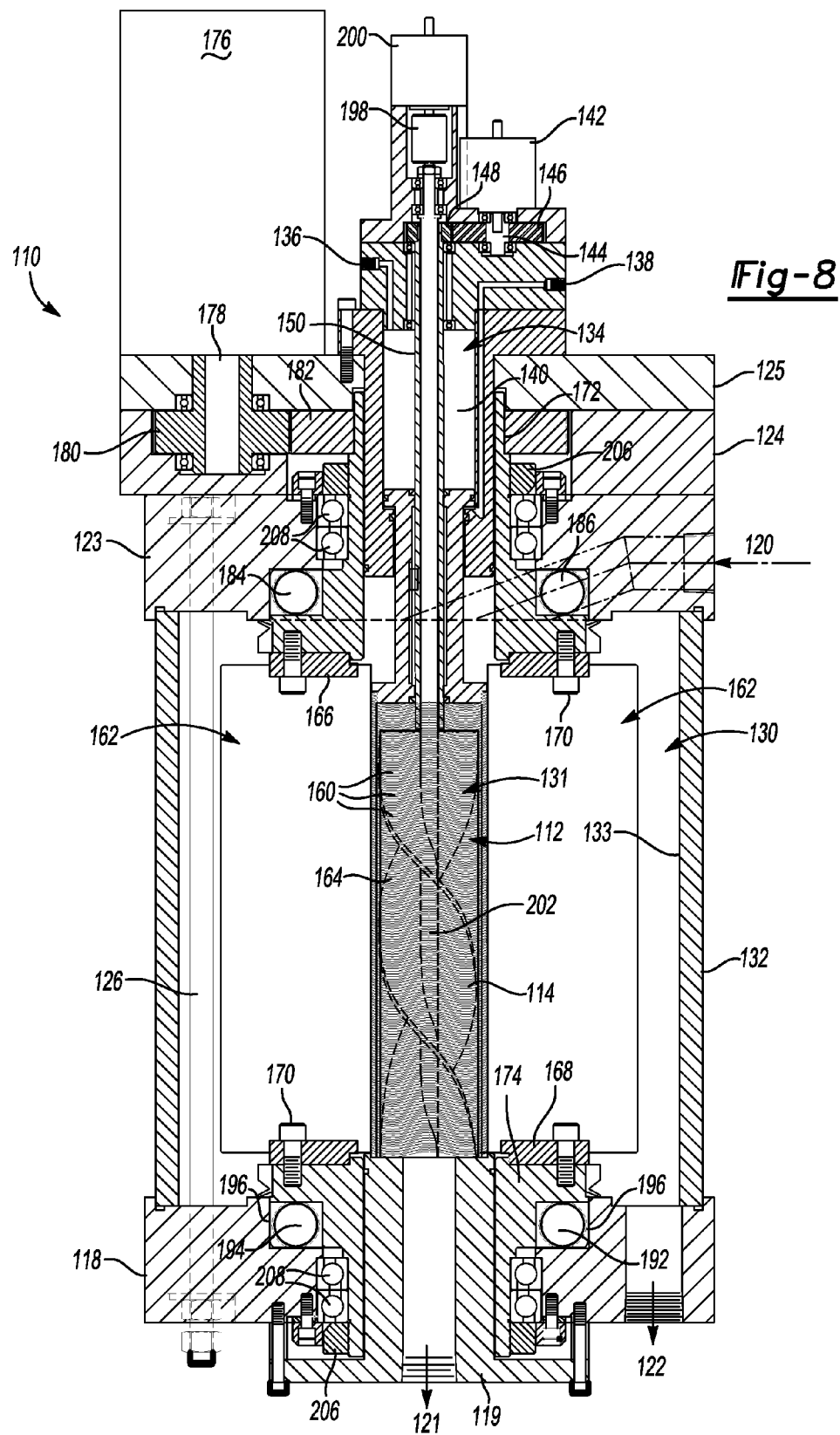
FIG. 8 is a side partially cross-sectioned view of the centrifugal filter apparatus shown in FIG. 7 with the helical filter element fully compressed.
Figure 9:
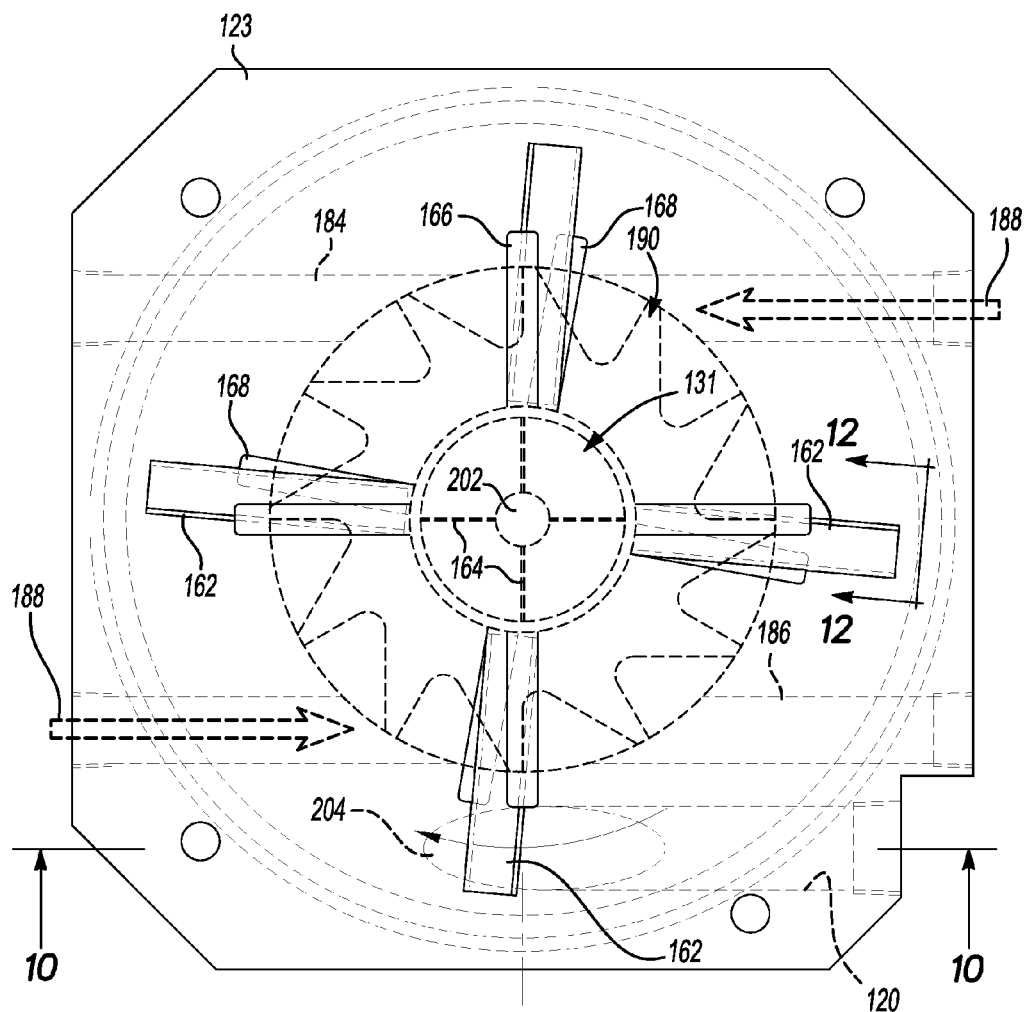
FIG. 9 is a top plan view of the filter assembly shown in FIGS. 7 and 8 with the motors removed.
Figure 11:
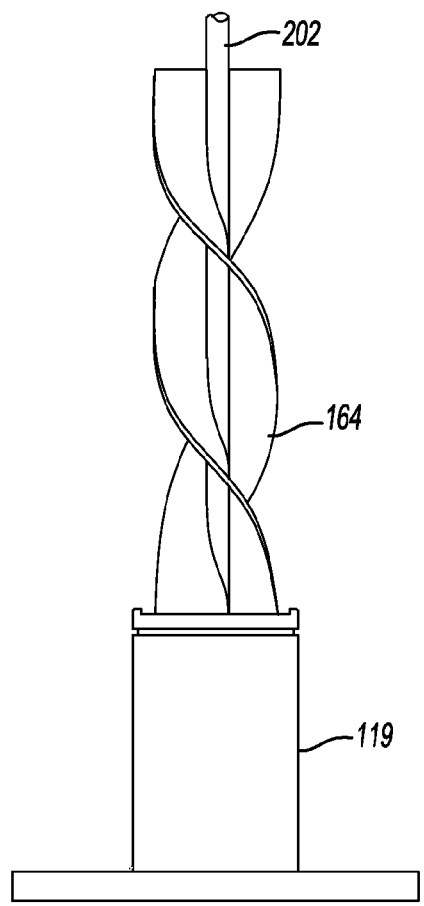
FIG. 11 is a partial side view of the internal radial centrifugal fins.

In the disclosed embodiment of the centrifugal filter apparatus 110 of this invention, the apparatus includes external rotating centrifugal radial fins 162 shown in FIGS. 7 and 8 and internal rotating centrifugal radial fins 164 shown in FIGS. 9 and 11. As described below, the external and internal centrifugal radial fins 162 and 164, respectively, cooperate during filtration and purging of the helical filter element 112 to significantly improve filtering by the filtering apparatus of this invention. In the disclosed embodiment of the centrifugal filter apparatus 110, the external centrifugal radial fins 162 are rigidly supported by upper bracket members 166 and lower bracket members 168 by bolts 170 as shown in FIGS. 7 and 8. The upper bracket member 166 is also rigidly connected by bolts 170 to the upper spindle 172 and the lower bracket members are rigidly connected to the lower spindle member 174 by bolts 170. The upper spindle 172 is rotatably driven by electric motor 176. The drive shaft 178 of the electric motor is fixed to an external drive gear 180, which drives a driven gear 182 fixed to the upper spindle 172. Thus, the electric motor 176 rotatably drives the upper spindle 172 which rotates the external centrifugal radial fins 162 within the outer or first filtration chamber 130.

In the disclosed embodiment of the centrifugal filter apparatus 110, the external centrifugal radial fins 162 are also driven by pneumatic pressure as also shown in FIG. 9. As shown in FIG. 9, the upper housing member 123, which serves as a cover for the filter cannister, includes two pneumatic channels 184 and 186, which have a circular cross-section as shown in FIGS. 7 and 8. Air under pressure is injected into the pneumatic channels 184 and 186 in opposite directions as shown by the arrows 188 to turn the turbine blade 190 at the outer surface of the spindle 172 as shown at 190 in FIG. 7. Thus, pneumatic pressure injected through pneumatic ports 184 and 186 rotate the external centrifugal radial fins 162. In the disclosed embodiment, the lower spindle 174 is also pneumatically driven. The lower spindle includes pneumatic channels 192, 194 which drive a turbine 196 as described above with regard to the pneumatic channels 184, 186 and turbine 190.

As will be understood from the above description of the drives for the external centrifugal radial fins 162, the fins may be rotatably driven by the motor 176 or pneumatic pressure injected through pneumatic ports 136 and 138 in the upper spindle 172 and through ports 192 and 194 through the lower spindle 174. As will be understood by those skilled in this art, the motor drive and the pneumatic drives may be used in combination depending upon the type of motor 176 or independently depending upon the conditions. For example, where the waste being filtered by the centrifugal filter apparatus 110 must be continuous, the pneumatic drive may be used as a back-up in the event of an electrical power failure.

In the disclosed embodiment of the centrifugal filter apparatus 110 of this invention, the internal centrifugal radial fins 164 as shown in FIGS. 9 and 11, are rotatably driven by electric motor 198 shown in FIGS. 7 and 8. The motor 198 is supported in a housing 200. The drive shaft of the motor 198 rotatably drives rod 202 and the internal centrifugal radial fins 164 are mounted on the rod 202 as shown in FIG. 9. Thus, the motor 198 rotates the internal centrifugal radial fins 164 independently of the external centrifugal radial fins 162.

Figure 10:
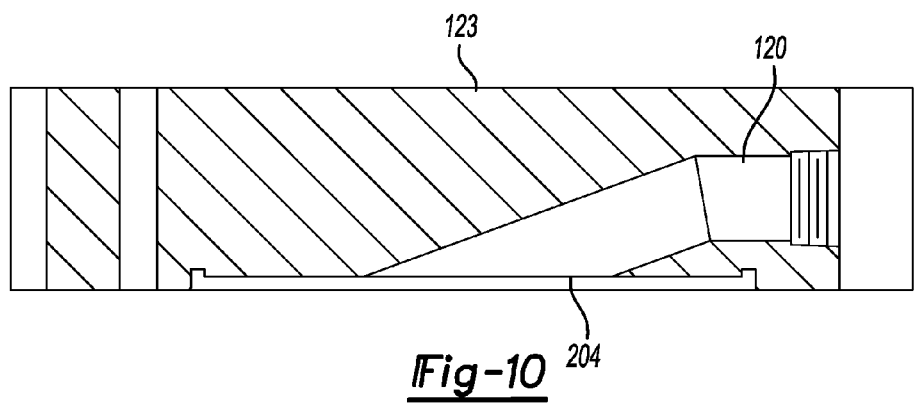
FIG. 10 is a cross-sectional view of FIG. 9 in the direction of view arrows 10-10.
Figure 12:
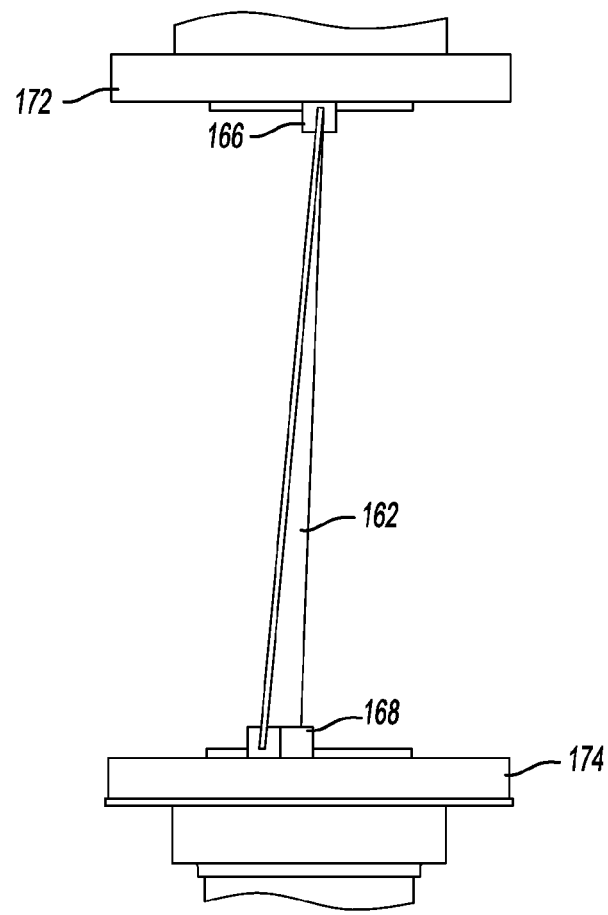
FIG. 12 is a partial side view of FIG. 9 in the direction of view arrows 12-12.

In the disclosed embodiment of the centrifugal filter apparatus 110, both the external and internal centrifugal radial fins 162 and 164, respectively, are canted relative to the axis of rotation of the fins to drive liquid in a predetermined direction. In the disclosed embodiment, the external centrifugal radial fins 162 are pitched or tilted relative to the axis of rotation as best shown in FIG. 12. As will be understood by those skilled in this art, the external centrifugal radial fins 162 may be formed in a spiral or pitch prior to assembly in the filter apparatus 110 or the fins may be planar and pitched during assembly by securing the ends into the upper and lower bracket members 166 and 168 as shown in FIG. 12. The internal centrifugal radial fins 162 in the disclosed embodiment are spiral and secured by welding, brazing, or other methods of attachment to the 202 in a spiral around the rod as shown in FIG. 11. As used herein, the term "canted" includes any tilt or angle, including spiral, generating a radial or axial force on the liquid in a desired direction to improve filtering. To further increase the rotational force on the liquid, the liquid waste is directed through the inlet 120 tangentially into the first annular filtration chamber 130 as also shown in FIGS. 9 and 10. The liquid waste is injected under pressure tangentially through the inlet port 120 into a spiral passage and exits through outlet 204 into the annual first filtration chamber 130 generating an additional centrifugal force.

Having described the basic components of the centrifugal filter apparatus 110, the method of filtration by the filter apparatus 110 will now be understood by those skilled in this art. The liquid to be filtered is injected under pressure into the inlet 120 and the liquid is then directed through the passage in the upper housing member 123 into the annular first filtration chamber 130, tangentially in the disclosed embodiment. The liquid to be filtered is very rapidly rotated in the annular first filtration chamber 130 by rotation of the external centrifugal radial fins 162, driving heavier or denser material in the filtrate radially outwardly under centrifugal force against the cylindrical inner surface 133 of the housing wall 132. The solids are also driven downwardly against the cylindrical inner surface 133 to the solids outlet 122 adjacent the cylindrical inner wall 133. During filtration, the internal centrifugal radial fins 164 are rotated to drive supernatant liquid downwardly toward the outlet 121, drawing liquid through the helical filter element 112 into the second filtration chamber 131, providing a final filter for the liquid waste. As will be understood from the above description of the filtration apparatus 10 in FIGS. 1 to 6, the filter pores 60 between adjacent coils may be adjusted to filter solids of any dimension or size. Further, in this embodiment of the centrifugal filter apparatus 110, much of the filtration is accomplished by the external centrifugal radial fins 162 which drive solids radially outwardly to the solids outlet 122. The helical filter element 112 of the centrifugal filter apparatus 110 of this invention may be easily backwashed quickly by injecting air through pneumatic port 138, raising the piston 140, opening the filter pores and driving backwash liquid through the supernatant outlet 121. This reversal in the direction of rotation of the internal centrifugal radial fins 162, driving backwash liquid through the helical filter element and the external radial fins 162 then drives the liquid radially outwardly through the solids outlet 122.

The dual chambered centrifugal and compressive filtration apparatus 110 will separate fluids and suspended solids into components based upon their respective densities by an integrated combination of centrifugal and filtration mechanisms. Incoming fluids containing solids are rotated at selected velocities, for example, 10,000 revolutions per minute, to achieve waste solids liquids separation in the millisecond to second range. This generates G-forces in the 13,000 range in a cannister whose radius is 15 cm. Solids separate from suspended fluid in this gravitational field at clearing times proportional to their densities and masses. The suspension introduced at the inlet 120 deposits on the cannister inner cylindrical surface 133. Upon clarification, liquid media is forced through the helical filter element 112. Heavy particles will clear quickly into the space between the external centrifugal radial fins 162 and the filter cannister's wall 133. It will be noted that the direction of rotation of the external fins 162 corresponds to the direction of flow of the incoming solids and fluid suspension through inlet 120. This parallel flow, where the suspended solids are introduced adjacent the outer surface subjects the dense and more massive particles to maximum G-forces, at the point of greatest radial distance from the center of rotation. The solids dewater and collect at the inner surface 133 of the cannister housing, thereafter continuing to rotate downward toward the solids output or exit 122. The aspect ratio cross-section to cannister height may vary from 4:20 to 4:1 depending on volume throughput and time sedimentation time requirements. The solids clearing (sedimentation) time (T) is proportional to radial distance from the center of rotation (r), velocity ($v_f$) and density (dm) of fluid medium, particle density ($d_p$), diameter ($D^2$) and a rotational velocity ($RPM^2$). From calculations using $T = r/v_{f \times} D^2(d_m - d_p) \times RPM2$, where r and D are in cms., the clearing times for waste particles are calculated to be in the millisecond to second ranges at $10^4$ RPMs, well within the dwell times within this centrifugal filtration device, if the volume is 20 gallons and the flow rate were to be 60 gallons per minute.

As set forth above, the external and internal centrifugal radial fins 162 and 164, respectively, may be canted with pitch values to reduce materials drag at high G-forces and to facilitate uniform radial transport in that field with maximum sheer and solid particulates. As used herein, "canted" includes angle or pitch as shown, for example, by the angled external centrifugal radial fins 162 in FIG. 12 or the fins may be spiral as the internal centrifugal radial fins 164 spirally surround the central drive rod 202. The pitch values may also vary from top to bottom of the cannister in a spiral manner, for example, to further reduce shear of incoming solids. The solids introduced at 120 are subjected to centrifugal forces acting on the solids; the suspending fluids, however, are driven by both centripetal (central orienting pressures) forces and negative (pull) pressures exerted by the internal centrifugal radial fins 164. The suspended fluids are thus clarified. The combination rapidly and completely separates solids and liquids, without the use of thickening or flocking chemistries. It is apparent that the internal and external centrifugal radial fins 162 and 164, respectively, along with line pressure force clarified fluids and solids to exit that their respective outlets 121 and 122, respectively. The centrifugal fins simulate a conventional centrifuge head, except that the cannister (head equivalent) is stationary and the fluids or solids are in motion. The non-sedimentation solids rotate in a neutral zone surrounding the helical filter 112 to be removed and combined with the solid fraction upon periodic backwash. These sedimented solids exit the cannister or housing adjacent the cylindrical inner surface 133 of the cannister housing 132 through solids outlet 122.

As will be understood, the centrifugal filter apparatus 110 of this invention may be used to remove microscopic and submicroscopic particles from an industrial stack, combination engine exhaust, syngasses generated by gasifiers and valuable machine oils. To extend the range of the filtration to submicroscopic levels, the helical coils 114 may include radial grooves as shown at 64 in FIG. 3 for filtration of submicroscopic particles when the helical filter element 112 is substantially fully closed as shown in FIG. 8. The backwash will take no longer than three seconds and may only infrequently be required due to the continuous removal of essentially all of the suspended solids by the centrifugal action of the external centrifugal radial fins 162. The backwash cycle is either called through computer-activated relays in response to an in-line pressure transducer at the inputs or is routinely set to occur at some time interval. Backwash cycles in a dual chambered centrifugal of this invention is capable of flow reversal of clean filtrate back through its core, through its filter, and out through the solids outlet carrying retentate with it, may be initiated in any sequence, either through individual units or in pairs or simultaneously through all units in parallel. If the central flow reversing internal radial fins 162 are not included in the filter unit, backwash may still be accommodated, whereby diverting a portion of the clean fluid of one filter of a pair to its parallel sister through split stream valves momentarily flushes the second unit. Repeat of the shared cleansing cycle completes the paired backwash. In the disclosed embodiment of the centrifugal filter apparatus 110, filtration and driver shaft units are pressure sealed internally with seals 206 as shown in FIGS. 7 and 8. Further, because the external centrifugal radial fins 162 are rotated at very substantial velocities, the spindles bearings 208, such as fully caged brass or ceramic bearings.

The centrifugal filter apparatus 110 may be used for clarifying used machine or vehicle oils, which are known to contain a wide distribution of metallic, silicone and plastic solids contaminants from millimeter to micron size. Rancid oils also contain colonial bacterial forms with cross-sections exceeding ten microns. Clarification improves the ability of reprocessing plants to recycle such waste products for reuse as machine or engine lubricants or as fuel blends for power plants. Most oils contain polar emulsifying agents to assist in the suspension of solid particulates, water and chlorinated paraffins. These emulsifying water-oil-particulate fractions, referred to as micelles are found to form size-specific cross-sections in the range of 250 microns and 50 microns. The flat wire helical filter element of this invention is found to break up these micelles as a consequence of frictional forces, assisted by heating. The flat wire helical coil filter element 112 breaks the emulsions in three phases, which the centrifugal filter will separate. After a micelle break-up with heat and passage through the helical filter element 112, the micelle cracks, releasing contained water, polar emulsifying agents, particulates, chlorinated paraffin, which all separate from useful oil in the centrifugal filter apparatus of this invention by a three-phase split.

The centrifugal filter apparatus 110 of this invention may also be combined with ancillary equipment for further clarification of the liquid and drying of the solids. For example, the liquid or supernatant outlet 121 of the filter cannister may be directed to a chelating or ion exchange adsorbent column to remove soluble (waste) chemicals. The liquid supernatant may be passed through a resin column, further purifying the liquid. To achieve further drying and sterilization of the solids exiting the filtration apparatus through solids outlet 122, the partially dry solids may be directed into a filter press consisting of a compressive element as shown at 54 in FIG. 2 having a piston compression, for example, wherein the partially dried solids are heated and compressed depending upon the application. This compression element is not, in this instance, used to adjust the filter's pores or apertures but to apply pressure to the solids fed to the filter's core though 22. This modification uses the filter's pores to retain the solids while expressing the liquid phase through 20. The base plate 18 may include a sliding valve which is triggered to open when the piston element driven by the shaft 52, below 54, has reached maximum extension as measured by the driver motor 46.

Figure 13:
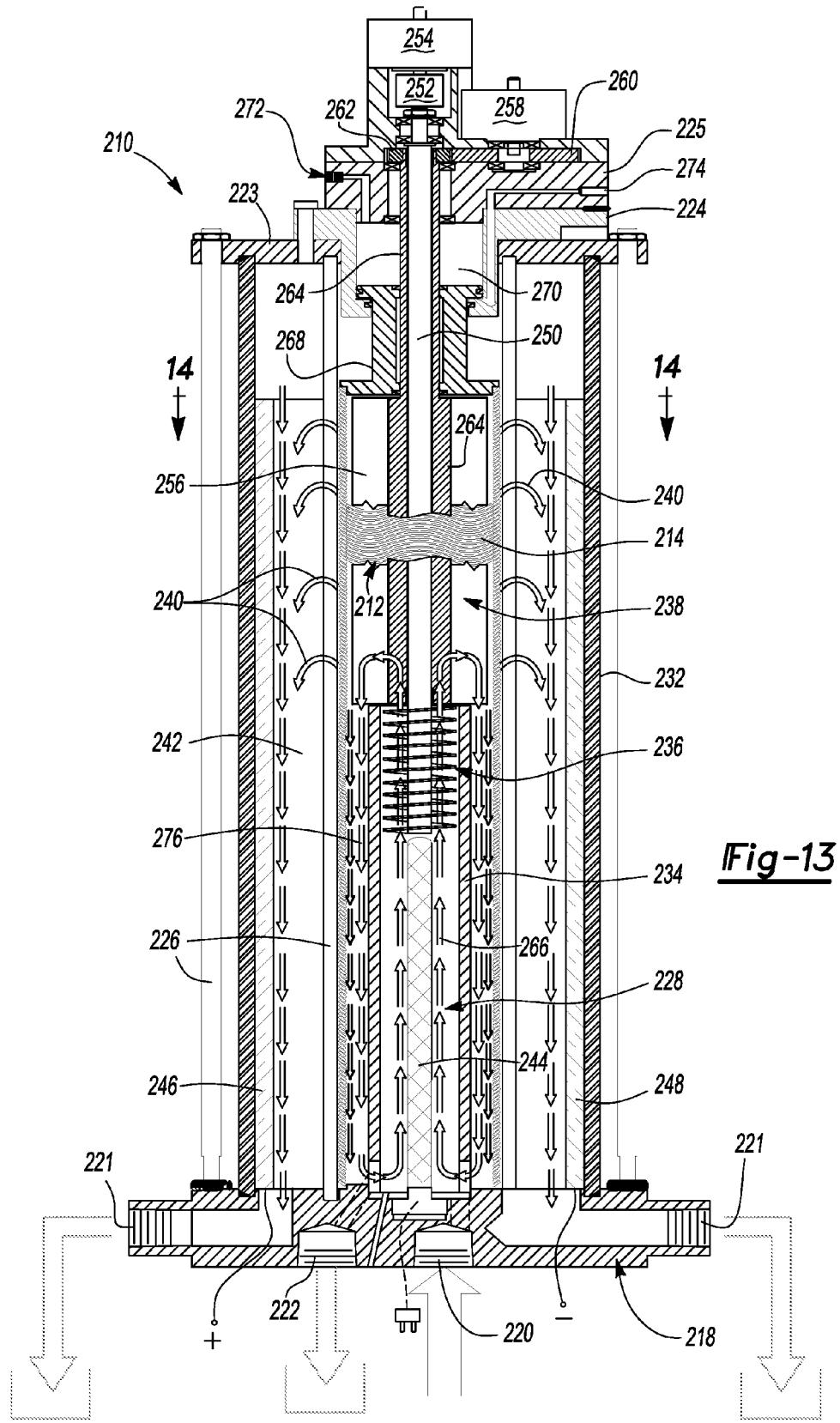
FIG. 13 is a partial side cross-sectional view of a third embodiment of the filter apparatus of this invention also illustrated a method of this invention.
Figure 14:
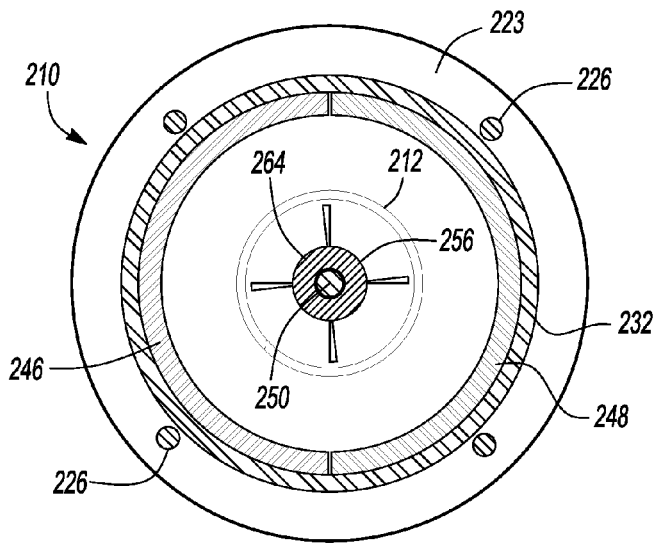
FIG. 14 is a top cross-sectional view of the embodiment of the filter apparatus shown in FIG. 13 in the direction of view arrows 14-14.
Figure 15:
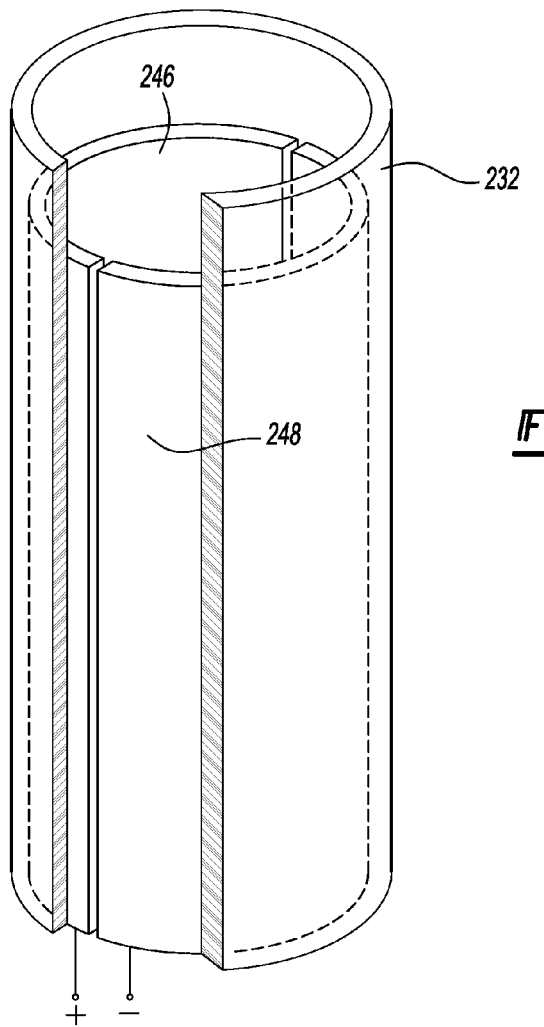
FIG. 15 is a top perspective view of components of the filter apparatus illustrated in FIG. 13.

The third embodiment of the filtration apparatus 210 and method of this invention illustrated in FIGS. 13 to 15 is specifically, but not exclusively adapted for removing organic waste from a liquid stream. As set forth above, the filtration apparatus 210 may be utilized to treat the liquid filtrate from the filter apparatus 110 disclosed in FIGS. 8 to 12 or any liquid containing waste organics. The apparatus 210 and method of this invention may be used for separating and extracting dissolved organic substances from waste fluid, such as water containing organic waste, further purifying the fluids to a virgin state and concentrating the accumulated organic solids as may be recycled and converted to fuels, for example, for energy generation. As set forth above, the filtration apparatus 210 is particularly, but not exclusively, adapted for removing organic waste from a liquid waste stream to form potable water, such as the liquid stream 122 from the exit of the filter apparatus 110 shown in FIGS. 8 to 12. The third embodiment of the filtration apparatus 210 shown in FIGS. 13 to 15 also includes an annular filter element 212 having a plurality of circumferentially spaced filter pores which may preferably filter organic material in the nanometer particle size range as described further below. The annular filter element may comprise a continuous flexible resilient helical coil including a plurality of helical coils 214 each having a regular sinusoidal shape in a direction of the helix defining circumferentially spaced loop-shaped filter pores between adjacent coils as shown at 12 in FIGS. 1 to 6 and 112 in FIGS. 7 and 8. Alternatively, other types of annular filter elements, preferably microfilters, may be utilized in the embodiment of the filtration apparatus 210 disclosed in FIGS. 13 and 14.

The disclosed embodiment of the filtration apparatus 210 includes a lower housing member 218 having a central inlet 220, supernatent outlets 221 and a solids outlet 222. The filtration apparatus further includes a first upper housing member 223 enclosing the filter apparatus, a second upper housing member 224 defining a piston as discussed below and a third upper housing member 225 supporting the drive mechanisms for the filter apparatus as also discussed below. As will be understood from the above description, the elements of the filtration apparatus 210 have been numbered in the same sequence where appropriate as the elements of the filter apparatus 110, but in the 200 series to reduce the requirement for a more detailed written description of like elements. The filtration apparatus 210 is retained by a plurality of inner and outer circumferentially spaced retention posts 226 which retain the cylindrical housing or cannister 232 between the lower housing member 218 and the first upper housing member 223 as shown in FIG. 13. As will be understood, however, the shape of the cannister 232 is a matter of design choice depending upon the function of the filtration apparatus.

In the disclosed embodiment, the filtration apparatus 210 includes a central liquid waste treatment chamber 228 located within the annular filter element 212 at a lower end adjacent the inlet 220. The liquid waste treatment chamber 228 is enclosed by a cylindrical baffle 234 having an outer surface spaced inwardly from the annular filter element 212. In the disclosed embodiment, the cylindrical baffle 234 extends from the lower housing member 218 upwardly within the annular filter element 212 and the upper end surrounds the first turbine 236. As described below, the first turbine 236 draws liquid from the liquid waste treatment chamber 228 to the second turbine 238 which drives the liquid radially outwardly through the annular filter element 212 into an annular filtrate or supernatent chamber 242 and the supernatent or filtrate liquid is then disposed out of the filtration apparatus 210 through filtrate outlets 221. As described below, the filtrate may be potable water depending upon the application and the waste liquid treated.

In the disclosed embodiment of the filtration apparatus 210 of this invention, the liquid waste treatment chamber 228 includes an ultraviolet lamp 244 which extends axially from adjacent the lower housing member 218 to adjacent the first turbine 236 and the internal surface of the cylindrical baffle 234 is reflective or silvered to reflect the ultraviolet rays of the ultraviolet lamp 244 into the waste treatment chamber 228. Further, in the disclosed embodiment, the filtration apparatus 210 includes semi-cylindrical anode and cathode plates 246 and 248, respectively, which are semi-circular in cross-section as best shown in FIG. 15. As described below, the negatively and positively charged ionic species in the organic waste migrate toward their corresponding plates 246 and 248 during the filtration process.

In the disclosed embodiment, the first turbine 236 comprises a plurality of spiral fins spirally mounted on a central shaft 250 similar to the spiral fins 164 shown in FIG. 11. In the disclosed embodiment, the spiral fins of the first turbine 236 are driven by a pneumatic motor 252 in housing 254 connected to shaft 250. The second turbine 238 in the disclosed embodiment comprises a plurality of canted fins 256, similar to the fins 162 shown in FIGS. 7 to 9 and 12, which are rotatably driven by a high speed gear drive 258, similar to the gear drive 142 shown in FIGS. 7 and 8. The gear drive 258 is connected to a drive gear 260, which drives a driven gear 262 connected to the annular drive shaft 264. The canted fins 256 are supported by the annular drive shaft, such that the high speed gear drive 258 rotates the canted fins 256 about the annular drive shaft. In the disclosed embodiment, the first turbine 236 is rotated at a slower velocity than the second turbine 238, such that the first turbine draws liquid upwardly from the liquid waste treatment chamber 228, where the liquid is treated by the ultraviolet lamp 244, and the treated liquid is then driven radially outwardly by the second turbine 238 through the annular filter element 212 into the annular filtrate chamber 242 as described above.

In the disclosed embodiment, the filter pores of the annular filter element 212 may be opened and closed by operation of the pneumatic piston 268. The piston 268 reciprocates in a pneumatic chamber defined by the second upper housing member 225 as shown in FIG. 13. Pneumatic pressure through port 272 in the second upper housing member 225 drives the piston downwardly in FIG. 13 to compress the helical coils 214 of the annular filter element 212 as described above. When filtration is complete and the annular filter element 212 is to be backwashed, pneumatic pressure through portion 274 raises the piston 268, opening the filter pores as described above and permitting backwashing from the annular filtrate chamber 242 through the annular filtered element 212 into the liquid waste treatment chamber 228 and the annular chamber surrounding the central shaft 250. In one preferred embodiment, wherein the filtration apparatus of this invention is used to filter a liquid waste containing organic molecules, the annular filter element may include radial grooves as shown at 64 in FIG. 3, such that the filter element functions as a microfilter to filter organic waste as further discussed below. As will be understood, however, the filter drive may also include a drive as shown, for example, at 176 in FIGS. 7 and 8 adapted to rotate a helical coil 214 relative to the remainder of the helical coils of the filter element to open and close the filter pores as described above with reference to FIGS. 7 and 8 and annular filters may also be utilized in the filtration apparatus 210 of this invention.

Having described the third embodiment of the filtration apparatus 210 shown in FIGS. 13 to 15, the method of removing organic waste from a liquid waste stream by the filtration apparatus 210 may now be described. Liquid containing organic waste is received in the filtration apparatus 210 through the central lower inlet 220. The first turbine 236 then draws the liquid upwardly around the ultraviolet lamp 244 as shown by arrows 266. The ultraviolet lamp 244 provides an output, in the 180 nanometer spectral range, which generates singlet oxygen and hydroxyl free radicals in water flowing over it. This source oxidizes soluable organics to carbon dioxide and water, transforms organics to carbanions and aggregates by cross-linking large biological molecules, including particulate cell forms. The short wave length ultraviolet generating tube 244 surrounded by a highly reflective mirrored surface on the cylindrical baffle 234 generates a greatly enhanced oxygen and hydroxyl free radical population, which also destroys residual ozone that may have been injected in-line preceding this free radical treatment. The reflective mirrored internal surface of the cylindrical baffle 234 surrounding the ultraviolet lamp 244 in the waste treatment chamber 228 facilitates multiple passages of ultraviolet photons through the liquid transported though the liquid waste treatment chamber 228. The organics so treated with oxygen and/or free radicals are ionized, aggregated by cross-linking or oxidized to volatile gases and water.

The water with the treated organic waste is then received by the second turbine 238 rotating at a greater velocity than the first turbine 236. The canted fins 256 of the second turbine 238 drive the liquid radially outwardly through the annular filter element 212 into the annular filtrate chamber 242 as shown by arrows 240. Where the filtration apparatus 210 is utilized to remove organic waste from a liquid waste stream, the annular filter element 212 is preferably a microfilter having a filter pore size in the nanometer range. For example, the helical filter element 212 may be similar or identical to the filter element 12 shown in FIG. 3 having a plurality of circumferentially spaced radial laser etched grooves having a diameter between one and 100 nanometers, more preferably on the order of between 1 and 10 nanometers depending upon the size of the ions. Thus, when the helical filter element is substantially "closed" by the piston 268 described above, the filter pores comprise solely the radial grooves 64 shown in FIG. 3 and the organic waste which is cross-linked or aggregated by the ultraviolet lamp 244 in combination with the mirrored surface of the cylindrical baffle 234 are filtered out by the annular microfilter element 212.

It is important to note that a consequence of the strong oxidation treatment by the ultraviolet lamp 244 is the generation of anions and small molecular anionic fragments which separate from the water solvent and migrate to the cathode plate 248 in the strong electromagnetic field generated between the cathode plate 248 and the anode plate 246. These plates 246 and 248 in the disclosed embodiment are semicircular and surround the annular microfilter element 212. As the suspending fluid circulates inside the annular filter as shown by arrows 276 and are then drawn through the filter's nanometer sized pores into the annular filtrate chamber adjacent the charged plates 246 and 248. The negatively and positively charged ionic species migrate toward the corresponding charged plates 246 and 248 of the opposite polarity and exit on backwash as concentrated aggregated sludge through the drains 221. Clean deionized water, therefore, drains through 222. Any aggregated or crossed linked particles collecting on the inside surface of the annular filter element 212 are removed in the backwash. As described above, the filtration apparatus 210 of this invention may be quickly and thoroughly backwashed by "opening" the pores of the microfilter 212 by raising the piston 268 and driving liquid in the reverse direction through the microfilter 212.

As set forth above, various modifications may be made to the filtration apparatus 210 within the purview of the appended claims. For example, other methods of treating organic waste in the liquid waste treatment chamber 228 may be used with the filtration apparatus 210 of this invention. One associated function includes means to employ affinity resins which circulate in the liquid waste treatment chamber, eliminating the ultraviolet lamp 244 and the reflective surface of the cylindrical baffle 234. The dual set of centrifugal turbines 236 and 238 create a circulating fluidized column. The lower first turbine 236 is driven at a slower speed to facilitate mixing and reaction time between a moving fluid or gas phase and a solid matrix phase. The solid matrix phase may consist of catalysts, affinity or chelating resins and the like; the moving phase may be reactant gases or dissolved solvents in various solvents including water. The upper second turbine 238 rotates at a greater velocity to generate very high gravitational forces, capable of separating loosely bound solutes from their solid matrices when uncoupled by reducing agent or acid/base reagents added to the high speed stripping chamber. Other organic waste treatment methods may also be utilized in the liquid waste treatment chamber 228, preferably increasing the particle size of the organic waste.

As will be understood by those skilled in this art, the components of the filtration apparatus 210 will in many cases depend upon the application. One suitable embodiment of an ultraviolet lamp is a 1,500 watt quartz sleeve ultraviolet lamp available from Phillips having a wave length less than 180 nanometers which creates free radicals without ozone which will recombine in water in the presence of oxygen. The housing or cannister 232 may be formed of any suitable material, including stainless steel. Further, the shape of the cannister will depend upon the application and may also be formed of clear Plexiglas. The charged plates 246 and 248 are formed of a conductive material, such as stainless steel. The cylindrical baffle 234 may also be formed of stainless steel and in the preferred method of this invention includes a silvered or mirrored surface. The preferred velocity of the first and second turbines 236 and 238 will also depend upon the application. In one embodiment, the first turbine 236 is rotated at a relatively slow speed, such as 500 to 1,000 rpm. The high speed second turbine 238 may be rotated at a greater velocity to drive liquid radially through the annular filter element 212, such as about 10,000 rpm or greater. It is also possible to inject ozone directly into the liquid waste treatment chamber to further treat the organic waste within the liquid stream preferably in line preceding liquid input into the chamber. Other more conventional annular filter elements may also be used in the filtration apparatus 210 of this invention; however, where the filtration apparatus is used to treat organic waste as described above, the annular filter element 212 is preferably a microfilter as described. Having described the preferred embodiments, this invention is now claimed as follows.

The invention claimed is:

1. A filtration apparatus, comprising:
   a central annular filter element having circumferentially spaced filter pores;
   a liquid waste treatment chamber located within said annular filter element at a lower portion of said annular filter element;
   a first rotating turbine located within said annular filter element drawing liquid upwardly from said liquid waste treatment chamber within said annular filter element;
   a second rotating turbine located within said annular filter element above said first rotating turbine receiving liquid from said first rotating turbine rotating at a greater velocity than said first rotating turbine and driving liquid radially outwardly through said spaced filter pores of said annular filter element into an annular filtrate chamber surrounding said annular filter element; and
   a liquid outlet receiving liquid filtrate from said annular filtrate chamber.

2. The filtration apparatus as defined in claim 1, wherein said liquid waste treatment chamber includes an axial ultraviolet lamp having an outer surface spaced from an inner surface of said filter element and a reflective cylindrical surface surrounding said waste treatment area and said first rotating turbine draws liquid from around said axial ultraviolet lamp.

3. The filtration apparatus as defined in claim 1, wherein said filtration apparatus includes a cathodic plate and an opposed anodic plate surrounding said annular filtrate chamber.

4. The filtration apparatus as defined in claim 1, wherein said first and second rotating turbines include rotating canted fins rotatably supported about a longitudinal axis coincident with a longitudinal axis of said central annular filter element.

5. The filtration apparatus as defined in claim 4, wherein said first rotating turbine includes a plurality of spiral fins each extending spirally around a driven shaft.

6. The filtration apparatus as defined in claim 4, wherein said second rotating turbine includes a plurality of fins each defining an angle relative to said longitudinal axis.

7. The filtration apparatus as defined in claim 1, wherein said central annular filter element is a continuous flexible resilient helical coil having a regular sinusoidal shape in a direction of the helix defining circumferentially spaced loop-shaped filter pores between adjacent helical coils, and including a filter drive engaging said helical coil to adjust a volume of said loop-shaped filter pores.

8. The filtration apparatus as defined in claim 7, wherein said helical coil is formed from flat wire stock forming flat engaging upper and lower surfaces on adjacent helical coils and said filter drive rotating one of said helical coils relative to an adjacent helical coil into and out of registry, thereby adjusting a volume of said filter pores.

9. The filtration apparatus as defined in claim 8, wherein said flat engaging upper and lower surfaces of said helical coils includes circumferentially spaced radial grooves having a width of between one and one hundred nanometers, wherein when said coils are closed in full registry, said filter pores are said radial grooves.

10. The filtration apparatus as defined in claim 8, wherein said filter drive includes a piston driven against said helical coil by pneumatic or hydraulic pressure for increasing or decreasing a volume of said filter pores and permitting quick release during purging.

11. A filtration apparatus, comprising:
- a central annular filter element including a continuous flexible resilient helical coil having a sinusoidal shape in the direction of the helix defining circumferentially spaced filter pores;
- a liquid waste treatment chamber located within said annular filter element at a portion of said annular filter element;
- a first rotating turbine located within said annular filter element drawing liquid from said liquid waste treatment chamber within said annular filter element;
- a second rotating turbine located within said annular filter element spaced from said first rotating turbine receiving liquid from said first rotating turbine rotating at a greater velocity than said first rotating turbine and driving liquid radially outwardly through said annular filter element into an annular filtrate chamber surrounding said annular filter element; and
- a liquid outlet receiving liquid filtrate from said annular filtrate chamber.

12. The filtration apparatus as defined in claim 11, wherein said first and second rotating turbines include canted fins rotatably supported about a longitudinal axis coincident with a longitudinal axis of said central annular filter element.

13. The filtration apparatus as defined in claim 12, wherein said first rotating turbine includes a plurality of spiral fins rotatably supported by a driven shaft.

14. The filtration apparatus as defined in claim 12, wherein said second rotating turbine includes a plurality of fins each defining an angle relative to said longitudinal axis.

15. The filtration apparatus as defined in claim 11, wherein said annular filter element includes a filter drive engaging said helical coil to adjust a volume of said loop-shaped filter pores.

16. The filtration apparatus as defined in claim 15, wherein said helical coil is formed from flat wire stock forming flat engaging upper and lower surfaces on adjacent helical coils, and said filter drive rotates one of said helical coils relative to an adjacent helical coil into and out of registry, thereby adjusting a volume of said filter pores.

17. The filtration apparatus as defined in claim 16, wherein said flat engaging upper and lower surfaces of said helical coil includes circumferentially spaced radial grooves having a width of between one and one hundred nanometers forming a micro filter when said coils are closed in full registry.

\* \* \* \* \*